United States Patent
Gollungberg et al.

(10) Patent No.: US 6,799,783 B2
(45) Date of Patent: Oct. 5, 2004

(54) ARRANGEMENT FOR UNDERRUN PROTECTION IN VEHICLES

(75) Inventors: Peter Gollungberg, Kyrkesund (SE); Lars Forsman, Torslanda (SE); Carl Rohdén, Stockholm (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/605,507

(22) Filed: Oct. 3, 2003

(65) Prior Publication Data

US 2004/0119303 A1 Jun. 24, 2004

Related U.S. Application Data

(63) Continuation of application No. PCT/SE02/00640, filed on Apr. 2, 2002, now abandoned.

(30) Foreign Application Priority Data

Apr. 3, 2001 (SE) ................................ 0101186

(51) Int. Cl.[7] .......................... B60R 19/26; B60R 19/34
(52) U.S. Cl. ........................ 293/102; 293/132; 293/133
(58) Field of Search ................................ 293/102, 103, 293/104, 117, 118, 119, 131, 132, 133, 143, 150

(56) References Cited

U.S. PATENT DOCUMENTS

| | | | | | |
|---|---|---|---|---|---|
| 3,913,963 | A | * | 10/1975 | Persicke | 293/15 |
| 4,247,138 | A | * | 1/1981 | Child | 293/103 |
| 4,541,661 | A | * | 9/1985 | Hawk | 293/117 |
| 5,520,428 | A | * | 5/1996 | Bell | 293/118 |
| 5,632,518 | A | * | 5/1997 | Kendall | 293/103 |
| 5,673,953 | A | * | 10/1997 | Spease | 293/118 |
| 6,076,871 | A | * | 6/2000 | Jarvis et al. | 293/123 |
| 6,089,629 | A | * | 7/2000 | Hope et al. | 293/132 |
| 6,116,667 | A | * | 9/2000 | Torcomian | 293/132 |
| 6,176,529 | B1 | * | 1/2001 | Kitzmiller et al. | 293/102 |
| 6,176,530 | B1 | * | 1/2001 | Gollungberg | 293/133 |
| 6,183,025 | B1 | * | 2/2001 | Hope et al. | 293/131 |
| 2003/0137156 | A1 | * | 7/2003 | Ledford et al. | 293/102 |

FOREIGN PATENT DOCUMENTS

| | | |
|---|---|---|
| DE | 2438828 A1 | 2/1975 |
| DE | 3318778 A1 | 1/1994 |
| EP | 0557733 A1 | 9/1993 |
| GB | 2095630 A1 | 10/1982 |
| WO | WO 9841423 A1 | 9/1998 |

* cited by examiner

Primary Examiner—D. Glenn Dayoan
Assistant Examiner—Greg Blankenship
(74) Attorney, Agent, or Firm—Novak Druce LLP

(57) ABSTRACT

Method and arrangement for providing an underrun protection arrangement for a vehicle (1) having a frame (3), an impact element (7) arranged in a position that corresponds to an anticipated stress from a force, F, in the event of a possible collision with another vehicle (2). At least one link element (8) is also included that is firmly connected to the impact element (7) and is fixed so that it can pivot in relation to the said frame (3). An energy-absorbing element (11) is provided that connects the impact element (7) to the frame (3) and which is designed to compress in the event of a pivoting movement on the part of the impact element (7). At least one locking element (10) is included that is designed to permit the pivoting movement only in the event of a stress acting on the impact element (7) with a force that exceeds a predetermined limit.

9 Claims, 4 Drawing Sheets

… (US 6,799,783 B2)

ARRANGEMENT FOR UNDERRUN PROTECTION IN VEHICLES

CROSS REFERENCE TO RELATED APPLICATIONS

The present application is a continuation patent application of International Application No. PCT/SE02/00640 filed 2 Apr. 2002 which was published in English pursuant to Article 21(2) of the Patent Cooperation Treaty, and which claims priority to Swedish Application No. 0101186-5 filed 3 Apr. 2001. Both applications are expressly incorporated herein by reference in their entireties.

BACKGROUND OF INVENTION

1. Technical Field

The present invention relates to an underrun protection arrangement for vehicles that include a frame and an impact element arranged in a position that corresponds to an anticipated stress from a force in the event of a possible collision with another vehicle. At least one link element is provided that is firmly connected to the impact element and is fixed so that it can pivot in relation to the frame. An energy-absorbing element is included that connects the impact element to the frame and which is designed to be compressed in the event of a pivoting movement by the impact element.

A primary utilization of the invention is in connection with heavier commercial vehicles, particularly in order to prevent a passenger vehicle from penetrating under the commercial vehicle in the event of a possible head-on collision between the commercial vehicle and the passenger vehicle.

2. Background Art

Larger motor vehicles, such as commercial vehicles, are often designed with a relatively high ground clearance. One major reason for such design is the need to be able to use the vehicle when driving on uneven ground. Today's commercial vehicles normally have a ground clearance at the front of the vehicle on the order of 40–50 cm.

This fact that a commercial vehicle normally has a relatively high ground clearance can present a road safety risk. This is due to the fact that in any head-on collision between the commercial vehicle and a passenger car, there is a risk that the front section of the passenger car will penetrate under the front of the commercial vehicle and thus become wedged between the roadway and the front underside of the commercial vehicle. This can lead to the front of the commercial vehicle penetrating the passenger compartment of the passenger car with enormous force, which in turn may result in serious injuries to the occupants of the vehicle. In some instances, the commercial vehicle can even continue forwards and roll over the passenger car.

Various solutions have been suggested for solving the aforementioned problem. The commercial vehicle itself may be designed with a lowered front; that is to say, having a front end in which the ground clearance is so low that a passenger car does not have room to penetrate under the commercial vehicle and become wedged between the larger vehicle and the roadway in the event of a collision. Such a measure, however, is at odds with the aforementioned desire for high ground clearance in order to facilitate driving on uneven ground. This need, therefore, precludes a reduction of the ground clearance in many types of commercial vehicle.

Another solution to this problem is to provide the commercial vehicle with a special underrun protection in the form of a reinforced structure, such as a force-absorbing beam element arranged horizontally at the front of the commercial vehicle. More specifically, such a beam element is arranged in a position that corresponds to an anticipated stress from a force in the event of a collision with a passenger car. By means of such an element, it is possible to prevent a passenger car from penetrating under the front of the commercial vehicle.

Such underrun protection can furthermore be arranged so that it is energy-absorbing and absorbs energy in the event of stressing during a collision. This further reduces the risk of serious injuries in the event of a collision.

A previously known energy-absorbing underrun protection is shown in the document EP-A-0557733. This underrun protection includes an impact element that is pivotally suspended in a vehicle frame by way of two articulated arms. The underrun protection further comprises an energy-absorbing piston and cylinder arrangement for absorbing energy in the event of stress acting on the impact element.

This known construction carries a disadvantage in that, because of the arrangement with the aforementioned articulated arms, it comprises a large number of moving parts, which makes it unnecessarily complicated, and carries a risk that its function may become impaired. Furthermore, the construction is to some extent unstable in the event of lateral stresses; that is to say, during a collision sequence in which a passenger car collides with the impact element at a certain angle in relation to the longitudinal direction of the vehicle. In such situations there is a risk that this known construction will give way under relatively low impact stresses.

The known construction, moreover, affords limited scope for regulating the energy absorption in a controlled manner during a collision. In this respect, there is a general problem regarding the need to adapt the energy-absorbing capacity of an underrun protection to an anticipated situation in the event of a collision between a passenger car and a commercial vehicle.

SUMMARY OF INVENTION

An object of the present invention is to provide an improved energy-absorbing underrun protection for commercial vehicles that functions reliably with controlled energy absorption under impact stress during a collision.

The above-mentioned object is achieved by means of an arrangement of the aforementioned type, but include special features including at least one locking element designed to permit pivoting movement only in the event of a stress acting on the impact element with a force that exceeds a predetermined limit.

By means of the invention, a stress (force) experienced during a collision can be absorbed with minimum possible injury to the occupants of the passenger car, which are the persons most at risk of injury in the event of a collision between a passenger car and a commercial vehicle.

According to a preferred embodiment of the invention, the locking element comprises (includes, but is not limited to) at least one retaining bolt which is arranged to extend through each link element and which is designed to maintain a fixed connection between the link element and the frame until the limit is reached. In this way, controlled energy absorption is obtained under impact stress.

According to one particular embodiment of the invention, the force/stress limit after which collapse is permitted is defined as an anticipated magnitude of such a force/stress expected to be experienced in the event of a collision with a passenger car following an essentially complete compression of crumple zones provided in the passenger car. The controlled energy absorption can thus be optimally adapted to the impact stress and the sequence that occurs in an anticipated crash situation between a passenger car and a commercial vehicle.

A further object of the invention is to provide an improved energy-absorbing underrun protection that is laterally stable. In this sense, it is meant that the arrangement can withstand deformation when acted upon entirely or partially from the side; that is, transverse to the direction of travel of the vehicle as stated above. This object is achieved at least in part because the link element overlaps a bracket to which the link element is fixed along an area that is designed to meet predetermined requirements regarding stress acting on the impact element in an entirely or partially transverse direction to the longitudinal direction of the vehicle.

Very good lateral stability can be obtained, in particular, if the link element is formed with an essentially L-shaped component having two plate-like side elements in which a first side element extends essentially transversely to the longitudinal direction of the impact element and a second side element extends essentially in the longitudinal direction of the impact element, and the side elements are connected to one another.

BRIEF DESCRIPTION OF DRAWINGS

The invention will now be described in more detail with reference to a preferred exemplary embodiment depicted in the accompanying drawings, in which.

DETAILED DESCRIPTION

Figure 1:
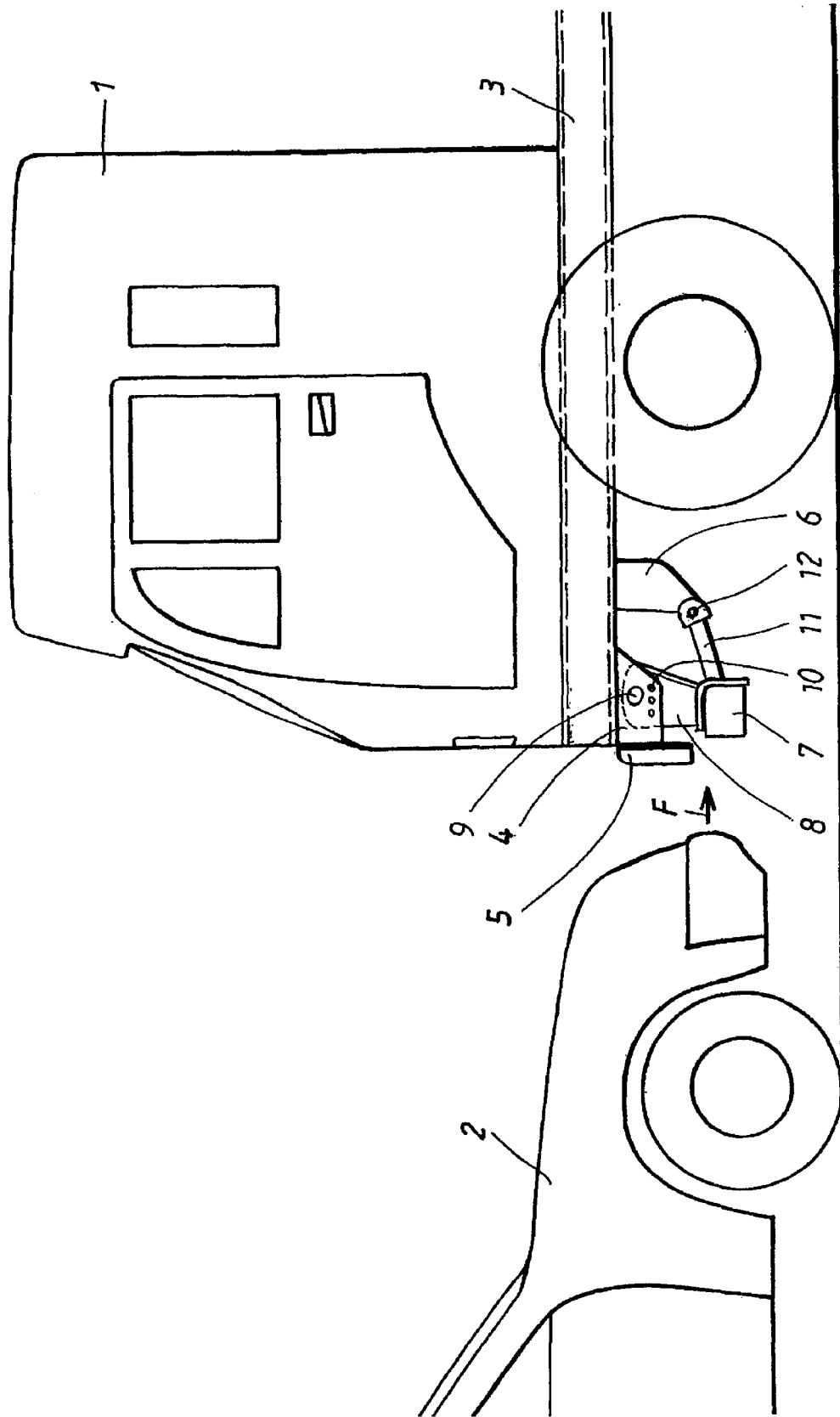
FIG. 1 a representative side elevational view of an arrangement configured according to the teachings of the present invention.

In at least one embodiment, the invention takes the form of an underrun protection arrangement that is particularly, but not exclusively, intended for commercial vehicles having a relatively high ground clearance. FIG. 1 is a somewhat simplified side view showing a commercial vehicle 1, which is provided with such an underrun protection arrangement that is configured according to the teachings of the present invention. A passenger car 2 is also shown in the Fig. It can be appreciated from the Fig. that a possible head-on collision between a passenger car and a high-ground-clearance commercial vehicle can lead to the passenger car becoming wedged between the commercial vehicle and the roadway. A fundamental object of the present invention is to prevent such a situation arising.

The commercial vehicle 1 is of conventional construction with a frame, which in turn comprises (includes, but is not limited to) two longitudinal frame members, but only one of which frame members 3 can be seen in FIG. 1. Each frame member 3 extends essentially in the longitudinal direction of the commercial vehicle 1, up to its front section. According to a preferred embodiment of the invention, and that which is illustrated, there are two front brackets 4 fixed to the front part of each frame member 3. Only one of these two front brackets 4, however, can be seen in the figure. Furthermore, a bumper 5 is conventionally arranged so that it extends horizontally across the front section of the commercial vehicle 1 and is fixed to the frame member 3.

Two rear brackets 6 are fixed, one each, to the frame members 3 in such an orientation that each rear bracket 6 is positioned behind a respective front bracket 4. As mentioned before, only one of the two rear brackets 6 can be seen in FIG. 1.

In order to prevent the occurrence of a passenger car 1 from penetrating under the front of the commercial vehicle 1 in a head-on collision or offset-collision (i.e. a collision in which the longitudinal axis of symmetry of the passenger car is displaced somewhat from parallel {transverse} to the longitudinal axis of symmetry of the commercial vehicle), the commercial vehicle 1 is provided with an underrun protection arrangement. According to the illustrated embodiment, the underrun protection arrangement comprises an impact element 7, exemplarily in the form of a beam, extending essentially horizontally and transversely to the longitudinal direction of the commercial vehicle 1. This transverse beam 7 is preferably made of steel or other suitable material and has an essentially rectangular (or alternatively square) cross-section. The cross-beam 7 is arranged in the commercial vehicle 1 at a height corresponding to one, or a range of certain predetermined ground clearances.

The ground clearance of the cross-beam 7 may be defined as the distance from the underlying roadway to the underside of the cross-beam 7. As stated above, this distance typically considers vehicle requirements regarding accessibility on uneven ground and, where applicable, in accordance with prevailing statutory requirements. For conventional commercial vehicles, the ground clearance is normally less than or equal to 400 mm.

The cross-beam 7 is moveably suspended in relation to the aforementioned frame. More specifically, the cross-beam 7 is preferably fixed in such a way that it is fixed to two link elements 8 (only one link element 8 of which can be seen from FIG. 1), which are in turn pivotally fixed to each front bracket 4. Each link element 8 is furthermore pivotally supported in a shaft journal 9 which runs through each front bracket 4. In this way the cross-bream 7 is pivoted in relation to the frame structure of the commercial vehicle 1. This pivoting movement is permitted under certain operating conditions as will be described in greater detail below. In normal driving of the vehicle 1, for example, pivoting movement of the cross-beam 7 and the link elements 8 is prevented by the fact that the link elements 8 are locked in relation to each front bracket 4 by at last one, and preferably a plurality of locking elements 10, for example three, exemplarily in the form of strong retaining bolts.

The cross-beam 7 is furthermore connected to each rear bracket 6 by two energy-absorbing connecting elements in the form of two tubes or bars 11 that are longitudinally compressible. It should be appreciated that only one of the two tubes 11 can be seen in FIG. 1.

Each energy-absorbing tube 11 is firmly connected to the cross-beam 7 by the aforementioned link elements 8 (exemplarily, the tube 11 is suitably welded to the corresponding link element) and is rotatably (pivotably) fixed to each rear bracket 6. More specifically, the tube 11 is pivotally fixed to a further shaft journal 12 extending through both the tube 11 and the rear bracket 6.

Primary structure and function of the invention will now be described in detail, primarily with reference to FIG. 2. Therein, a detailed view is provided from which the cross-beam 7 and its interconnection can appreciated. In the event of a possible collision between the commercial vehicle and a passenger car, the cross-beam 7 will be acted upon by a large force, F. This force, F, will be transmitted to each front bracket 4 via each link element 8, the force being absorbed by the frame structure of the vehicle 1 by virtue of the fact that each front bracket 4 is fixed to the frame structure and that the link elements 8 are locked in relation to each front bracket 4 by the bolted connection formed by the aforementioned retaining bolts 10.

During an initial stage of such a collision, it is desirable that the cross-beam 7 should function essentially in-elastically as a rigid barrier. This is achieved through utilization of the retaining bolts 10, by means of which each link element 8 is held firmly anchored in each front bracket 4. In the course of such a collision, this requirement is also ensured by the fact that the front crumple zones, normally present in modern passenger cars, are deformed thereby absorbing some energy. In this way the energy developed in the initial stage of the collision will be largely absorbed through this deformation of the passenger car crumple zones. According to the illustrated embodiment of the present invention, the retaining bolts 10 are designed to withstand stresses imposed upon the impact element 7 during this initial stage.

The fact that the cross-beam 7 and the brackets 4 absorb the force F in the event of force/stress applied by the passenger car 2 prevents the passenger car 2 from penetrating between the commercial vehicle 1 and the roadway during this initial stage.

The condition prevailing when the crumple zones in the passenger car have been compressed and are no longer capable of absorbing any significant amount of additional means that the cross-beam 7 has reached certain components in the passenger car such as its engine or gearbox. An increase in the force/stress acting on the cross-beam 7 then occurs. One underlying principle of the invention is that the aforementioned retaining bolts 10 are designed and arranged in such a way that they give way and are torn apart at a predetermined force/stress/pressure limit which is preferably equal to the increased stress from the passenger car. This increased stress is therefore normally commensurate with the fact that the crumple zones of the passenger car are essentially no longer capable of absorbing any energy. In typical applications configured according to the invention, the retaining bolts 10 may suitably be dimensioned and designed so that they give way at a load exemplarily on the order of magnitude of 30 tons.

When the force acting on the impact element 7 exceeds a certain limit, the retaining bolts 10 will therefore break. As will now be described with reference to FIGS. 2 and 3, this in turn means that the cross-beam 7 together with the two link elements 8 is allowed to pivot backwards; that is, in the opposite direction to the direction of travel of the vehicle during the collision. This pivoting movement then occurs about the axis of rotation defined by the shaft journal 9. As can be seen with particular clarity in FIG. 2, each tube 11 is preferably formed with a recess or a slot 11a, which runs around the periphery of the tube 11. This slot 11a acts as a marker which defines a local weakening in the tube and which guides the process as the tube 11 is compressed under the stress primarily in its longitudinal direction. This marker affords greater scope for effectively controlling the deformation of each tube 11 in a desired way under a stress of the type described.

Figure 2:
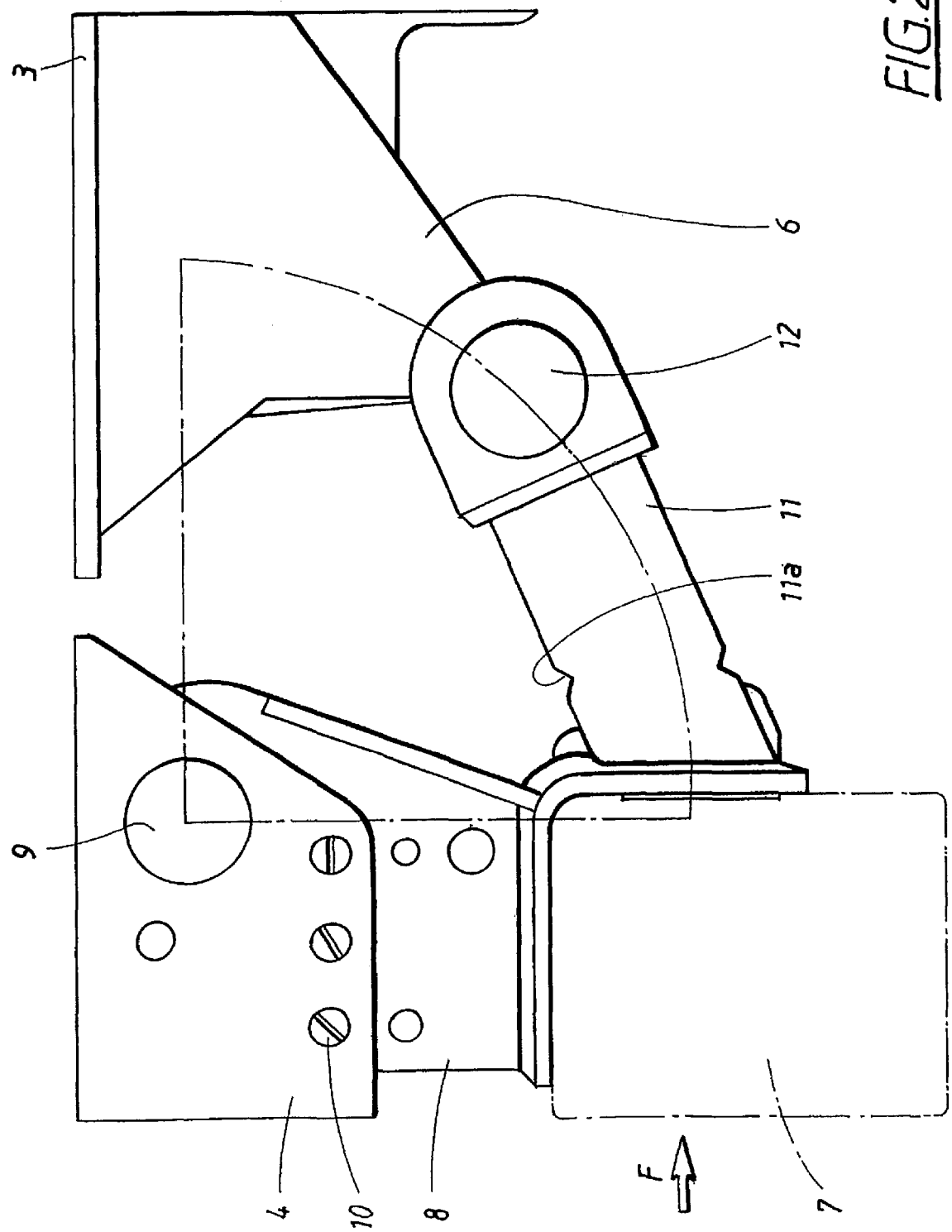
FIG. 2 is a detailed representative side elevational view of the run under protection arrangement, configured according to the invention, and shown in a first working position.
Figure 3:
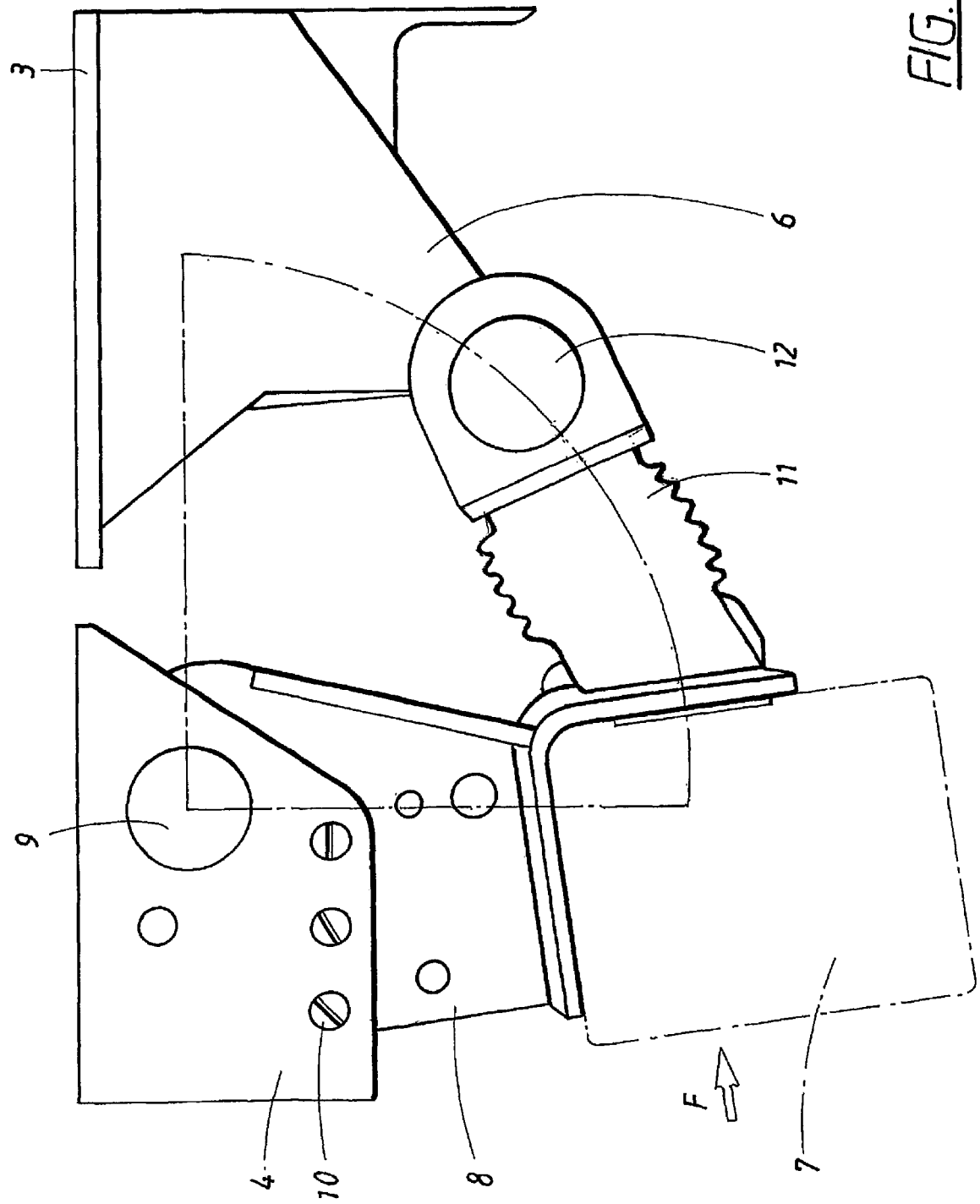
FIG. 3 is a view similar to that shown in FIG. 2, but with the run under protection arrangement shown in a second working position.

FIG. 3 largely corresponds to that shown in FIG. 2, but depicts a second working position in which the cross-beam 7 and each link element 8 have been pivoted some distance backwards. According to the invention, during the backward pivoting movement, energy absorption occurs due to the fact that each tube 11 is formed and fixed so that it allows energy to be absorbed as the tube 11 is compressed in its longitudinal direction. For this purpose, the tube 11 is formed with a cross-section and from a material that is designed to allow compression under the stress that occurs in the collision situation in question. As stated above, this stress is normally commensurate with the fact that the passenger car crumple zones have absorbed energy and that a certain increase in the force has then occurred. As a result of the compression of each tube 11, a further proportion of the energy that is developed during the collision will be absorbed.

One advantage of the invention is obtained in that each tube 11 is firmly fixed (by welding, for example) to each link element 8 while also being rotatably fixed to each rear bracket 6. That is, each tube 11 is rotatably fixed to the shaft journal 12 as can be seen in the figures. The fixation gives a well-adjusted deformation of the tube 11 as it pivots along a predetermined path. This in turn permits a predetermined, and effective deformation with high-energy absorption during that part of a collision sequence when the cross-beam 7 pivots backwards.

Figure 4:
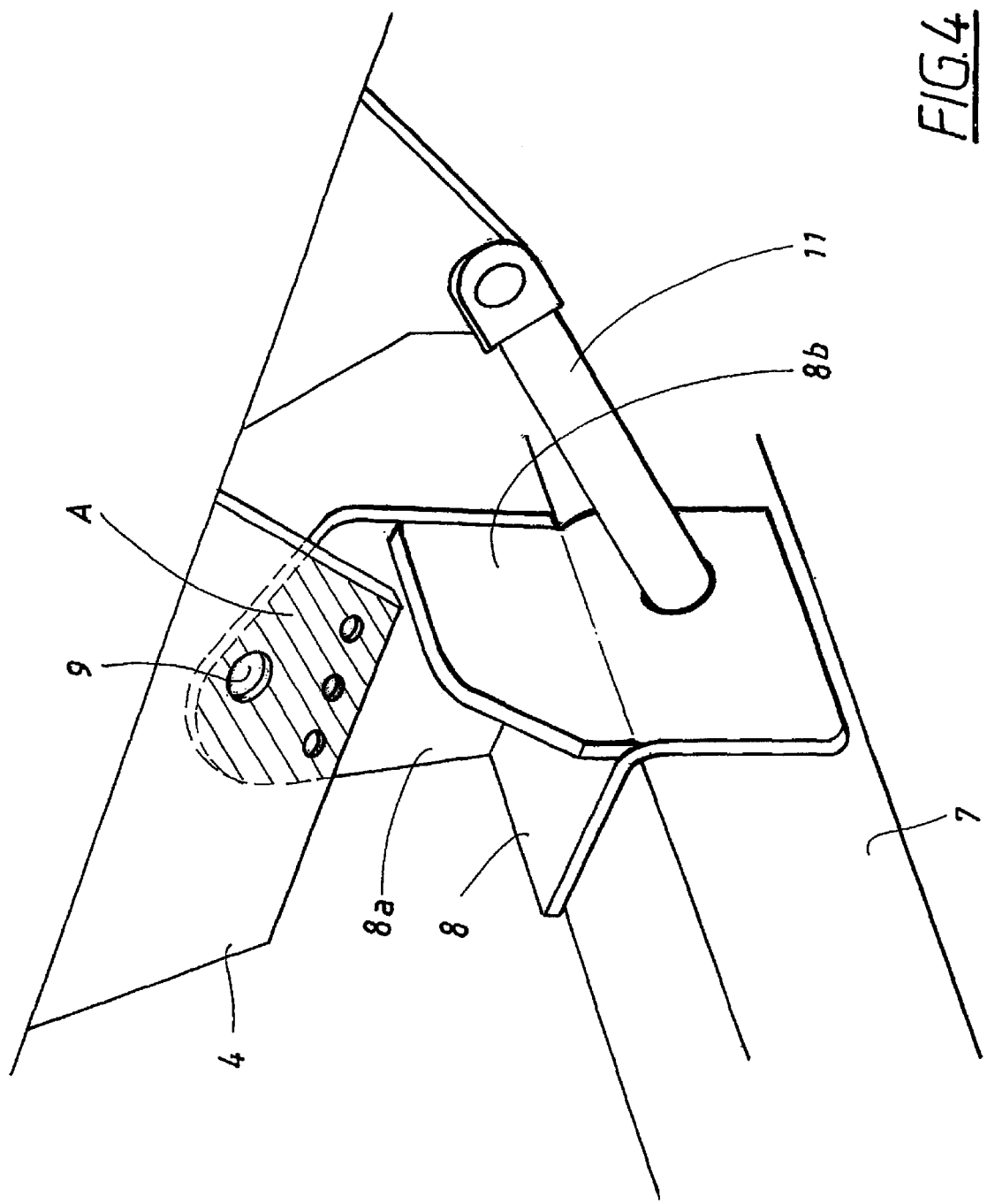
FIG. 4 is a perspective view taken obliquely from behind and showing the run under protection arrangement represented in the figures.

FIG. 4 shows an arrangement configured according to the teachings of the invention in a view from an oblique perspective from the rear (of the vehicle). The figure shows a section of the aforementioned cross-beam 7, in a fixed configuration; and more specifically, looking at the front left-hand part. Like parts of the arrangement are designated with like reference numbers across the figures.

From FIG. 4 it can be appreciated how each link element 8 is fixed to a corresponding front bracket 4. According to the illustrated embodiment, the area with which each link element 8 and corresponding front bracket 4 overlap one another is relatively large. In FIG. 4, this area is indicated by dashed lines and the reference designation, A. An important advantage obtained with this arrangement is that its lateral stability, that is to say the capacity to withstand stresses acting (entirely or partially) transversely to the direction of travel of the vehicle, depends on the size of this overlapping area, A. For this reason, the link element 8 and the front bracket 4 are formed in such a way that the area, A, is as large as possible; that is to say, it is large enough to meet the stipulated requirements with regard to lateral stability.

In order to further improve the lateral stability, the link element 8 is preferably formed as shown in FIG. 4; that is to say, as an essentially L-shaped component having two side elements, one side 8a being fixed to the corresponding front bracket 4 extending essentially transversely to the longitudinal direction of the impact element 7, and the other side 8b also being fixed to the front bracket 4 extending essentially at right angles from the first element 8a. In manufacturing, the link element 8, including the two elements 8a, 8b, are suitably made as two plate-like components that are oriented as shown in FIG. 4 and welded together and to the rest of the link element 8. All in all, this provides an advantage in the form of a further improvement in lateral stability.

It may therefore be noted that the invention preferably considers the fact that the impact element 7 functions as an elastic barrier under relatively low applied forces/stresses, and is in addition allowed to pivot about the shaft journal 9 while absorbing energy experienced under stresses that exceed a certain predetermined limit. The energy absorption is achieved by a controlled compression of the compression tube 11. The limit is determined by the dimensions and the placing of the bolted connection that is formed by the retaining bolts 10. Altogether, this affords optimal control of the energy absorption during a collision and a heightened degree of safety, especially for the occupants of the passenger car during a collision with the commercial vehicle.

The invention is not limited to the exemplary embodiments described above, but may be modified without departing from the scope of the claims below. For example, the invention can in principle be used in all types of vehicle such as trucks, loaders and busses in which a relatively high ground clearance is desirable. The invention is therefore not limited to use in conventional trucks.

With regard to the choice of material, the brackets 4 are preferably made of steel and the impact element 7 is preferably made of steel, aluminum or other suitable material.

The invention can furthermore, in principle, be used as an underrun protection system that is arranged on the rear end section of a vehicle or along the sides thereof. Finally, the brackets 4 and link elements 8 may be two or more in number.

The limit at which the pivoting movement of the impact element 7 described above is permitted (by the locking element 10 giving way and breaking) can be defined so that it corresponds to a situation in which the crumple zones in the passenger car have essentially been completely deformed. The invention is not limited to choice of selected limit, however, but can be implemented in that the limit can generally be set to a value commensurate with the passenger car having absorbed a certain amount of energy. The limit may also be determined, for example, on the basis of a stress with a force selected in accordance with prevailing statutory requirements.

Each tube 11 may have a different cross section; for example, circular, square or some other shape suitable for the desired compression of each tube 11. For an especially advantageous and controlled compression of each tube 11, it may in addition be provided with a marker 11a as shown in FIG. 2. The marker 11a may be oriented in different ways and be given different dimensions (e.g. width and depth) depending on the application in question, and also depending on the stipulated requirements and wishes with regard to the compression of the tube 11.

What is claimed is:

1. An underrun protection arrangement for a frame-including vehicle (1), the arrangement comprising:
   an impact element (7) positioned to confront an anticipated stress from a force, F, experienced in the event of a collision with another vehicle (2);
   at least one link element (8) connected to the impact element (7) and configured to be pivotably fixed to a frame member (3) of an incorporating vehicle (1); and
   an energy-absorbing element (11) connected to the impact element (7) and interconnectable to the frame (3), the energy-absorbing element (11) being adapted to be compressed in the event of pivoting movement of the impact element (7) and further comprising at least one locking element (10) adapted to permit pivoting movement of the impact element (7) only in the event of a force being imposed on the impact element (7) of a magnitude that exceeds a predetermined force limit, wherein said predetermined force limit is defined as an anticipated stress in the event of a collision with a passenger car following essentially complete compression of crumple zones provided in the passenger car.

2. The underrun protection arrangement as recited in claim 1, wherein the locking element (10) comprises at least one retaining bolt extending through each link element (8) and configured to maintain a fixed connection between the link element (8) and the frame (3) until the predetermined force limit is reached.

3. The underrun protection arrangement as recited in claim 1, wherein the energy-absorbing element (11) comprises a tubular component compressible in a longitudinal direction thereof, one end section of the tubular component being firmly connected to the impact element (7) and another end section thereof being rotatably connectable to the frame (3).

4. The underrun protection arrangement as recited in claim 1, wherein the impact element (7) is mounted to pivot in relation to the frame (3) on a shaft journal (9), the shaft journal (9) running through at least one bracket (4) connectable to the frame (3).

5. The underrun protection arrangement as recited in claim 4, wherein the link element (8) overlaps the bracket (4) along an area (A) configured to meet predetermined requirements regarding transverse acting forces on the impact element (7) relative to a longitudinal direction of the vehicle (I).

6. The underrun protection arrangement as recited in claim 1, wherein the link element (8) comprises an substantially L-shaped component having two plate-like side elements (8a, 8b), the first side element (8a) extending essentially transversely to the longitudinal direction of the impact element (7) and the second side element (8b) extending essentially in the longitudinal direction of the impact element (7), and the side elements (8a, 8b) being connected to one another.

7. The underrun protection arrangement as recited in claim 6, wherein the first side element (8a) is configured to pivot relative to the frame (3).

8. The underrun protection arrangement as recited in claim 1, wherein the energy-absorbing element (11) includes a weakening (11a) configured to guide collapse during compression of the energy-absorbing element (11).

9. A vehicle having an underrun protection arrangement, the vehicle (1) comprising:
   a frame (3);
   an impact element (7) positioned to confront an anticipated stress from a force, F, experienced in the event of a collision with another vehicle (2);
   at least one link element (8) connected to the impact element (7) and pivotably fixed to the frame member (3) of the vehicle (1); and
   an energy-absorbing element (11) connected to the impact element (7) and the frame (3), the energy-absorbing element (11) being adapted to be compressed in the event of pivoting movement of the impact element (7) and further comprising at least one locking element (10) adapted to permit pivoting movement of the impact element (7) only in the event of a force being imposed on the impact element (7) of a magnitude that exceeds a predetermined force limit, wherein said predetermined force limit is defined as an anticipated stress in the event of a collision with a passenger car following essentially complete compression of crumple zones provided in the passenger car.

* * * * *